(12) United States Patent
Barsoum

(10) Patent No.: US 11,046,030 B2
(45) Date of Patent: Jun. 29, 2021

(54) RAPID RESPONSE FABRICATION OF MARINE VESSEL PLATFORMS

(71) Applicant: Roshdy George S. Barsoum, McLean, VA (US)

(72) Inventor: Roshdy George S. Barsoum, McLean, VA (US)

(*) Notice: Subject to any disclaimer, the term of this patent is extended or adjusted under 35 U.S.C. 154(b) by 185 days.

(21) Appl. No.: 16/501,149

(22) Filed: Feb. 25, 2019

(65) Prior Publication Data

US 2020/0269530 A1    Aug. 27, 2020

(51) Int. Cl.
| | | |
|---|---|---|
| *B63B 5/24* | (2006.01) | |
| *B29C 70/52* | (2006.01) | |
| *B63B 73/00* | (2020.01) | |
| *B29C 51/20* | (2006.01) | |
| *B29C 51/26* | (2006.01) | |

(52) U.S. Cl.
CPC ........... *B29C 70/526* (2013.01); *B63B 73/00* (2020.01); *B29C 51/20* (2013.01); *B29C 51/261* (2013.01); *B29C 70/521* (2013.01); *B63B 5/24* (2013.01)

(58) Field of Classification Search
CPC ..... B29C 70/526; B29C 51/20; B29C 51/261; B29C 70/521; B63B 73/00; B63B 5/24; B63B 3/09; B63B 73/40; B63B 73/20; B63B 2005/245
See application file for complete search history.

(56) References Cited

U.S. PATENT DOCUMENTS

| | | |
|---|---|---|
| 6,386,131 B1 | 5/2002 | Barsoum |
| 6,941,888 B2 | 9/2005 | Barsoum |
| 6,953,001 B2 | 10/2005 | Fanucci et al. |
| 7,213,530 B2 | 5/2007 | Dasilva et al. |
| 7,731,046 B2 * | 6/2010 | Johnson ............. E04C 2/243 220/62.15 |

(Continued)

FOREIGN PATENT DOCUMENTS

WO    WO 2017/068602 A1    4/2017

OTHER PUBLICATIONS

Kabche, J et al "Structural response of a hybrid composite-to-metal bolted connection under uniform pressure laoding", Composite Structures, vol. 78., Issue 2, Apr. 2007, pp. 207-221.*

(Continued)

*Primary Examiner* — Jeffry H Aftergut

(57) ABSTRACT

Marine vessels, including combatant (naval) vessels are produced inexpensively without requiring the use of as many skilled personnel as is conventional. The vessel produced has a high strength metal truss structure (both above and below the water line) capable of carrying major hull loads. A number of curved or doubly curved composite (e. g. GRP) panels produced by vacuum assisted resin transfer molding are fastened by bolts, marine adhesives, and/or rivets to the below water line portions of the truss structure where necessary to handle slamming loads and to reduce water resistance and wake. Substantially flat composite pultruded panels are fastened to the truss structure both above the water line, and below the water line where the resistance to slamming loads and reduction of water resistance and wake are not critical. Necessary equipment is installed within the open truss volume before the above-water-line panels are fully installed.

20 Claims, 5 Drawing Sheets

(56) References Cited

U.S. PATENT DOCUMENTS

| | | | |
|---|---|---|---|
| 8,182,643 B2 | 5/2012 | Fanucci et al. | |
| 9,783,264 B2 | 10/2017 | deVries | |
| 9,869,533 B2 | 1/2018 | Vanarsdalen et al. | |
| 9,988,102 B2 | 6/2018 | LaRose et al. | |
| 10,124,546 B2 | 11/2018 | Johnson et al. | |
| 2004/0191514 A1 | 9/2004 | Antle et al. | |
| 2004/0211151 A1* | 10/2004 | Fanucci | B29C 70/525 52/745.19 |
| 2016/0361879 A1* | 12/2016 | Johnson | B29C 51/26 |

OTHER PUBLICATIONS

Baral, N, et al, "Improved impact performance of marine sandwich panels using through-thickness reinforcement: Experimental results", Composites: Part B, 41 (2010), pp. 117-123.*

Materials Science & Engineering, vol. 346, Issues1-2, Apr. 15, 2003, Abstract, pp. 122-131, Ray et al "Optimization of mechanical properties . . . ".

Naval Architecture, Oct. 9, 2017, Chakraborty et al, "What Is Advanced Outfitting in Shipbuilding?" www. marineinsight.com/naval-architecture.

Congressional Research Service, Oct. 19, 2018, O'Rourke, Summary, "Navy Force Structure & Shipbuilding Plans: Background . . . for Congress".

AMPTIAC Quarterly, V. 7 #3, pp. 55-61, Barsoum, "The Best of Both Worlds: Hybrid Ship Hulls Ue Composites & Steel" Oct. 2003.

Science Digest Part A 38 (2007) pp. 1763-1772, Maroun et al, "Steel truss/composite skin hybrid ship hull. Part II Manufacturing & sagging testing".

ASNE Day 2013, "Composite Ship Structures" Bartlett et al slide show, Feb. 19, 2013.

"Hybrid Composite & Metallic Hulls, The Best of Both Worlds," Barsoum; Mar. 2013.

ATI AL-6XN Alloy booklet, 2010, ATI Allegheny Ludlum.

21st Symposium of Naval Hydrodynamics, Sep. 11, 2016, Volpi et al, Full-scale Fluid-structure Interaction Simulation and Experimental Validation . . . .

Elastomeric Polymers With . . . , pp. 296-308, Barsoum, 2015; "Mechanisms Associated with HSREP and Interactions with Other Materials".

Elastic Polymers with . . . ; pp. 284-294; Dudt et al, 2015; "Effect of Polymer Coating on Helmet on Brain-Injury-Associated Parameters".

Ship Production, Second Edition, Storch et al, Cornell Maritime Press, Chapter III, pp. 60-62,67-70,82-84, 1995; "Product-Oriented Work Breakdown . . . ".

federalnewsnetwork.com, Nov. 2, 2018, "Navy can't build fast enough to reach 355 in time. So how will it get there?"; Thornton.

* cited by examiner

RAPID RESPONSE FABRICATION OF MARINE VESSEL PLATFORMS

The U.S. Government has a non-exclusive, royalty-free license to practice the subject invention for U. S. government use only.

BACKGROUND AND SUMMARY OF THE INVENTION

The number of marine vessels, particularly combatant naval vessels, that can be deployed is a function of cost and production time. However, in times of conflict and in periods where the number of platforms needs to be augmented quickly, conventional construction which relies on excessive welding and forming can be inadequate to meet these challenges. Further, one of the most important advantages in a war of attrition is to be able to sustain high production to offset losses to the enemy.

An approach that makes use of metal framing and, where possible, pultruded composite panels, offers an alternate approach for meeting accelerated production demands. Modern naval ships have very large areas of flat surfaces, both above and below the water line, which makes pultruded composites ideal for exploiting this conventional inexpensive mass production technology. The design methodology of the invention can result in high levels of flexibility for arrangements for countering emerging threats. According to the invention, as much as ninety percent of the requirements for welding, which is a strong cost driver, can be eliminated. A focus on straight-line contours will minimize forming operations. Portions of the structure of a marine vessel can be produced by less qualified journey-man level personnel from three industries: the bridge and high-rise steel buildings industry; the boating industry; and the composite manufacturing industry. This significantly increases the pool of workers that can be utilized in constructing marine vessels and capable naval designers can readily integrate the various parts produced by these industries into marine vessel structures.

According to one aspect of the present invention there is provided a marine vessel (desirably, although not necessarily, a combatant vessel) that is significantly easier and less expensive to produce than conventional marine vessels (particularly combatant vessels) but that is just as capable as existing combatant vessels at resisting slamming-side impacts, as well as at-sea loads and potential underwater shock or blast inputs. The marine vessel according to the invention has a hull, and comprises:

A high strength metal truss structure, both above and below the proposed water line of the marine vessel, capable of carrying major hull-girder-loads and providing the necessary stiffness to the hull. The metal truss structure may be produced using standard structural steel sections (i. e. I-beams, taper flanges, equal and unequal angles, channels, fabricated sections, and truss sections), welded box beams, or welded open sections, such as by using HLSA-100 steel and/or AL-6XNI stainless steel, depending upon the desired magnetic characteristics of the truss. In some cases for smaller ships like Littoral Combat Ships, the metal of the truss structure may be high strength aluminum 5000 series (including, but not limited to, H116 and H321). Alternatively all of these different metals may be used for different parts of the truss structure. The truss structure is desirably primarily characterized by straight line contours.

The vessel further comprises a plurality of at least one of curved and doubly curved composite panels produced by vacuum assisted resin transfer molding (such as described in U.S. Pat. No. 6,941,888 and the patents cited therein). Most desirably the composite panels are Glass Reinforced Plastic (GRP) panels wherein hundreds of glass strands (e. g. E glass or S-2 glass fibers) are combined with pigmented thermosetting UV resins, or vinyl ester for resin infusion in the VARTM process. Typically the exterior surfaces of the panels have a smooth finish, while the interior surfaces may have a smooth or crinkle finish. The composite panels are primarily fastened by bolts and/or rivets to below water line portions of the marine vessel metal truss structure where necessary to handle slamming loads and to reduce water resistance and wake.

The marine vessel further comprises substantially flat composite pultruded panels fastened primarily by bolts, marine adhesives, and/or rivets to the marine vessel metal truss structure both above the water line, and below the water line (not just in a deckhouse as in U.S. Pat. No. 8,182,643) where the resistance to slamming loads and reduction of water resistance and wake are not critical. Composite panels produced by pultrusion are much less expensive than those produced by virtually any other technology; for example, pultruded panels cost about one tenth those of VARTM (Vacuum-assisted Resin Transfer Molding) composites and can be produced in hours rather than weeks, ideal for mass production. The pultruded panels also can easily be produced with different thicknesses for different locations on the sides of the vessel (typically the panels would be thicker below the water line than above it) depending on the loads encountered. The pultruded composite panels are, using conventional techniques, sealed and fastened along their edges to the truss and the connections will support acoustic damping as well as structural damping.

In marine vessels according to the invention, because the metal truss carries all the loads and provides the stiffness of the structure (both the hull and superstructure), while the composite only carries pressure loads, glass fiber composites (GRP) are ideal for use in the invention since they are cheap, well-known (they have been used in the boating industry for more than fifty years), and have no issues with galvanic corrosion and almost infinite fatigue life.

The construction of the marine vessels according to the invention also provides the flexibility for rapid and easy access in the integration of the machinery and piping systems into the vessel because of the open architecture of the skeleton metal truss structure, and accommodates last minute changes in machinery/equipment or later upgrades.

According to another aspect of the present invention there is provided a method of producing a marine vessel, having a hull, and comprising:

a) Providing a high strength metal truss structure (preferably primarily characterized by straight line contours) to carry the major hull-girder-loads, provide the necessary stiffness to the hull, and to support composite material panels both above and below the marine vessel's proposed water line. b) Producing at least one of curved and doubly curved composite panels for portions of the marine vessel below the proposed water line using vacuum assisted resin transfer molding. c) Producing substantially flat composite panels for portions of the marine vessel both below and above the proposed water line using pultrusion. d) Primarily by bolting, conventional marine adhesives, and/or riveting fastening the curved and/or doubly curved composite panels from b) to the below water line portions of the marine vessel metal truss structure where necessary to handle slamming loads and to reduce water resistance and wake. And e) primarily by bolting, conventional marine adhesives, and/or riveting fastening the substantially flat composite panels from c) to the marine vessel metal truss structure both above the water line and below the water line where the resistance to slamming loads and reduction of water resistance and wake are not critical.

Procedure a) may be practiced using standard structural steel sections or welded box beams, and the steel for practicing a) may be selected from the group consisting essentially of HLSA-100 steel, AL-6XN stainless steel, and combinations thereof. Alternatively a) may be practiced using metal selected from the group consisting essentially of high strength aluminum 5000 series (e. g. H116 or H321), HLSA-100 steel, AL-6XN stainless steel, and combinations thereof. Most desirably a)-e) are practiced to produce a combatant naval vessel as the marine vessel, although supply ships or marine vessels in general may be produced thereby.

The method according to the invention also encompasses, after the practice of a) for at least the above-water line portions of the vessel, the installation of necessary equipment within the trussed volume prior to completing e). Further to minimize costs in some situations b) may be practiced using molds produced by 3D printing. Also, the marine vessel above water line portion may include a helicopter landing deck in which case the method further comprises f) constructing the helicopter landing deck using pultruded GRP composite panels in a sandwich configuration with an upper coating containing a conventional polymer with a high strain rate sensitivity to prevent impact damage (see U.S. Pat. No. 9,869,533). Still further the method may also comprise g) providing the interior surfaces of at least the majority of the composite panels with a coating of a fire retardant which also provides added protection against blasts, and assists in noise reduction.

According to another aspect of the present invention there is provided a method of constructing a combatant marine vessel comprising: i) producing a high strength hull truss structure including by welding together metal structural elements; ii) producing curved and/or doubly curved composite panels for portions of the marine vessel hull below the proposed water line using vacuum assisted resin transfer molding; iii) producing substantially flat composite panels for portions of the marine vessel hull both below and above the proposed water line using pultrusion; iv) installing propulsion and heavy machinery within the open metal truss structure; v) installing blast-resistant composite bulkheads within the open metal truss structure and connecting up all equipment needing connection; vi) primarily by bolting, conventional marine adhesives, and/or riveting fastening the curved and/or doubly curved composite panels from ii) to the below water line portions of the hull metal truss structure where necessary to handle slamming loads and to reduce water resistance and wake; vii) primarily by bolting, conventional marine adhesives, and/or riveting fastening the substantially flat composite panels from iii) to the hull metal truss structure both above the water line and below the water line where the resistance to slamming loads and reduction of water resistance and wake are not critical; viii) producing a deckhouse (superstructure) truss structure including by welding together high strength metal structural elements; ix) installing radar and other necessary equipment within the deckhouse open metal truss structure; x) attaching the deckhouse truss structure to the hull truss structure including by welding; and xi) either before or after x) fastening the substantially flat composite panels from iii) primarily by bolting and/or riveting to the deckhouse metal truss structure.

Desirably i) is further practiced using standard structural steel sections or welded box beams and to provide truss structure elements primarily characterized by straight line contours. Also, i) may be practiced by constructing fore-vessel, mid-vessel, and aft-vessel block zones, and subsequently assembling the three block zones together prior to or substantially contemporaneously with x).

It is the primary object of the present invention to provide a method of producing a marine vessel, and the marine vessel so produced, that is significantly less expensive than by using conventional techniques, yet has all of the desirable strength, stiffness, and hydrodynamic features necessary for a desirable marine vessel, including combatant vessels. This and other objects of the invention will become clear from a detailed description of the invention, and from the appended claims.

DETAILED DESCRIPTION OF THE DRAWINGS

Figure 1:
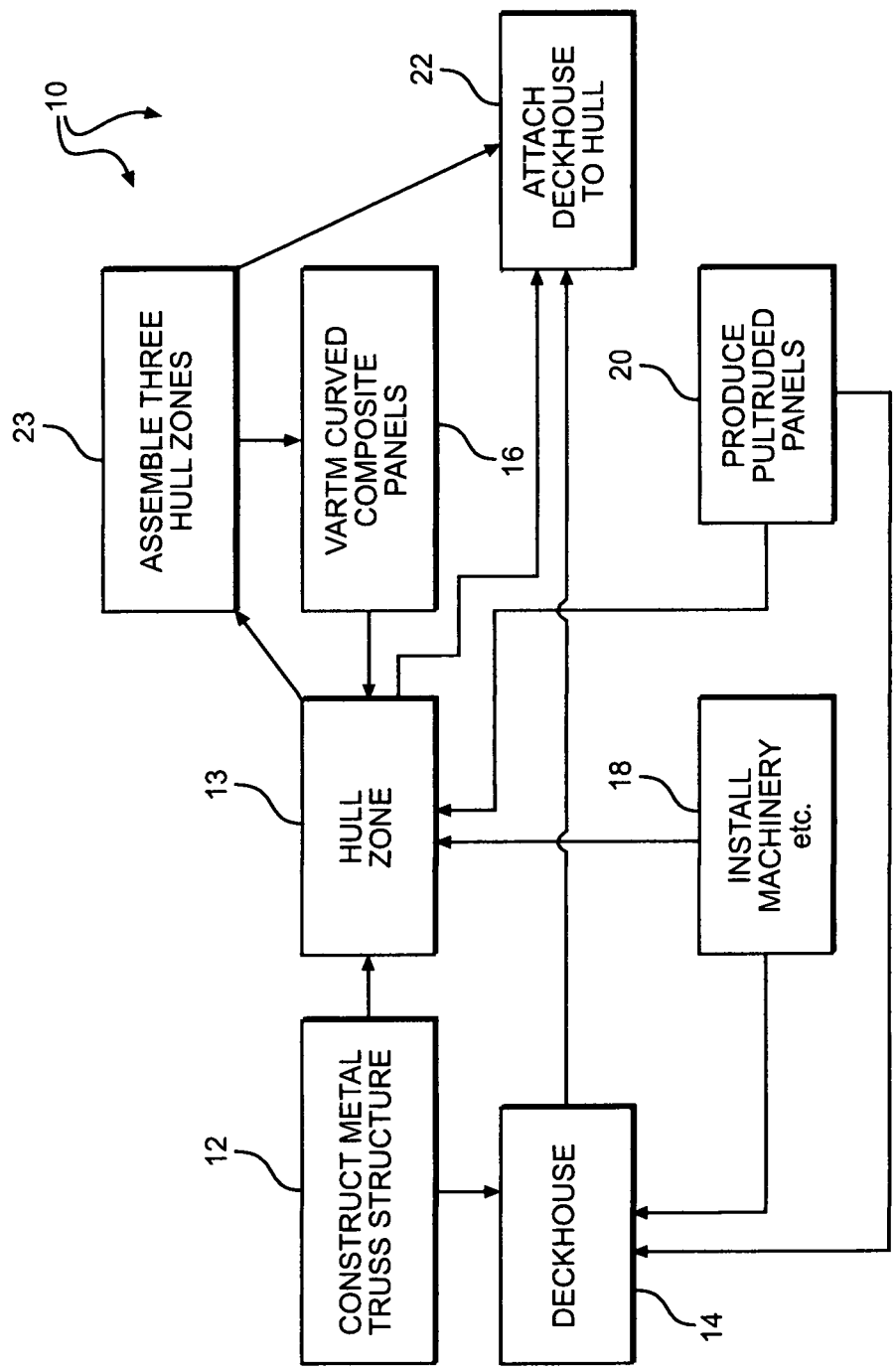
FIG. 1 is a schematic box diagram indicating the basic procedures for practicing an exemplary method according to the present invention.

FIG. 1 is a high level schematic illustration of various exemplary procedures that may be practiced according to the method of the present invention, shown generally by reference numeral 10. As indicated at 12, a high strength metal truss structure is produced, typically one for the hull 13, and another for the deckhouse (superstructure) 14. The metal truss structure for both the hull 13 and deckhouse 14 may be produced using standard structural steel sections (i. e. I-beams, taper flanges, equal and unequal angles, channels, fabricated sections, and truss sections) or welded box beams and is preferably primarily, if not substantially exclusively, characterized by straight line contours. The metal may be HLSA-100 steel and/or AL-6XNI stainless steel, depending upon the desired magnetic characteristics of the truss. In some cases the metal of the truss structure may be high strength aluminum 5000 series (including, but not limited to, H116 and H321), especially for the deckhouse 14 since stiffness is less necessary there. In some circumstances, all of these different metals (as well as others) may be used for different parts of the truss structure. In any event, the high strength metal truss structure must be capable of carrying the major hull-girder-loads, providing the necessary stiffness to the hull, and properly supporting composite material panels both above and below the marine vessel's proposed water line.

As illustrated at 16 in FIG. 1, the method includes producing at least one of curved and doubly curved composite (e. g. GRP) panels for portions of the marine vessel below the proposed water line using vacuum assisted resin transfer molding (VARTM), such as the SCRIMP™ process. Ultimately, as indicated by the arrow going from box 16 to box 13, the curved and/or doubly curved composite panels from 16 are fastened primarily by bolting, conventional marine adhesives, and/or riveting to the below water line portions of the marine vessel metal truss hull structure 13 where necessary to handle slamming loads and to reduce water resistance and wake. The molds for the VARTM process 16 may in some cases be inexpensively produced by conventional 3D printing.

As illustrated by box 18 in FIG. 1, all necessary machinery/equipment (which can include virtually anything from drive engines, electronic equipment including radar equipment and computers, piping systems, etc.) is installed within the open volumes of the hull 13 and deckhouse 14 truss structures before other panels (later described) substantially completely enclose the hull 13 and deckhouse 14 interior volumes.

As illustrated at 20 in FIG. 1, substantially flat composite (e. g. GRP) panels for portions of the marine vessel both below and above the proposed water line are produced using conventional pultrusion processes, and those panels are fastened primarily by bolting, conventional marine adhesives, and/or riveting to the marine vessel metal truss structure both above the water line (including hull 13 and deckhouse 14), and below the water line (hull 13) where the resistance to slamming loads and reduction of water resistance and wake are not critical. Conventional pultrusion processes produce composite panels much more cheaply than by virtually any other technology, for example typically at about one-tenth the cost of VARTM technologies.

Ultimately, as schematically illustrated at 22 in FIG. 1, the hull 13 and deckhouse 14 truss structures, either before or after fastening of all composite panels in place, are attached to each other using conventional technologies, including welding of the various truss structures together.

Alternatively, some shipyards may want to practice block outfitting of the hull, to speed-up production in enclosed buildings. In block outfitting (see "What Is Advanced Outfitting in Shipbuilding?" by S. Chakraborty in Marine Insight, Oct. 9, 2017 at https://www.marineinsight.com/naval-architecture/advanced-outfitting-in-shipbuilding/), several sections or "blocks" of the hull are constructed inside then moved outside to join the blocks together (e. g. including by welding) to form the completed hull. Dimensional adjustments are necessary when practicing this method. According to the invention, because the use of lightweight composites for much of the hull, the hull is desirably divided into three major block zones, fore-ship, mid-ship, and aft-ship zones (although more or fewer zones may be provided). After the hull and deckhouse are assembled and outfitted, or substantially contemporaneously therewith, the deckhouse 14 is attached to the completed hull 13. This block zone alternative is illustrated by box 23 in FIG. 1.

Figure 2:
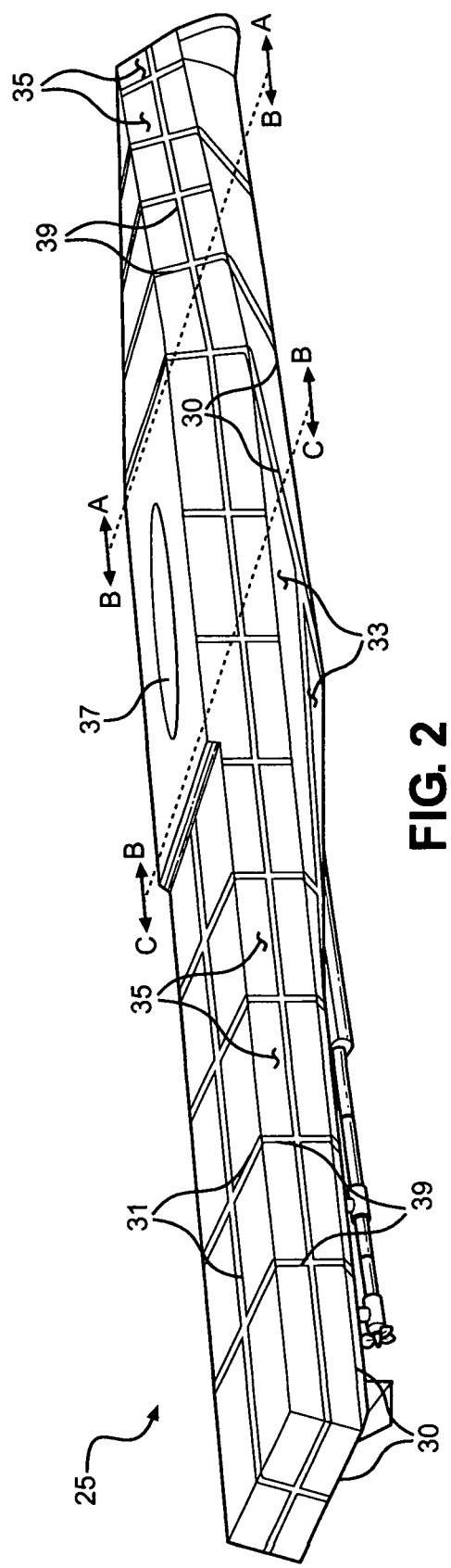
FIG. 2 is a schematic isometric illustration of an exemplary hull of a marine vessel produced according to the invention with panels applied and with the interior metal truss structure visible for illustrative purposes only.
Figure 3:
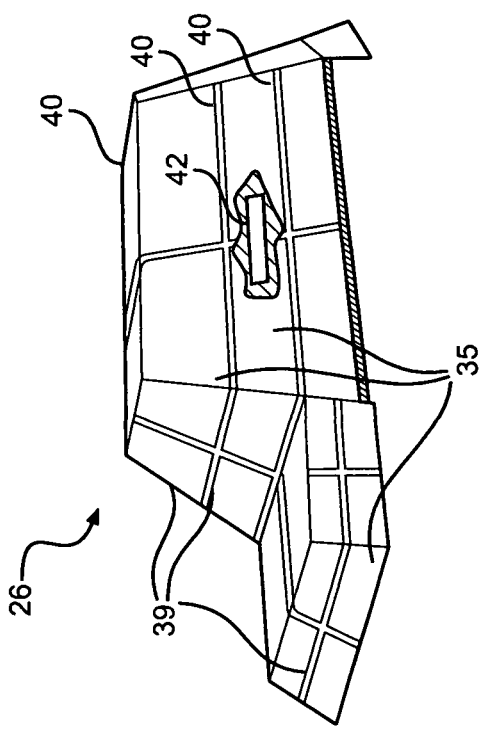
FIG. 3 is a schematic isometric illustration of an exemplary deckhouse of a marine vessel produced according to the invention with panels applied and with the interior metal truss structure visible for illustrative purposes only with a portion of the panels cut away to schematically illustrate conventional equipment enclosed thereby.
Figure 4:
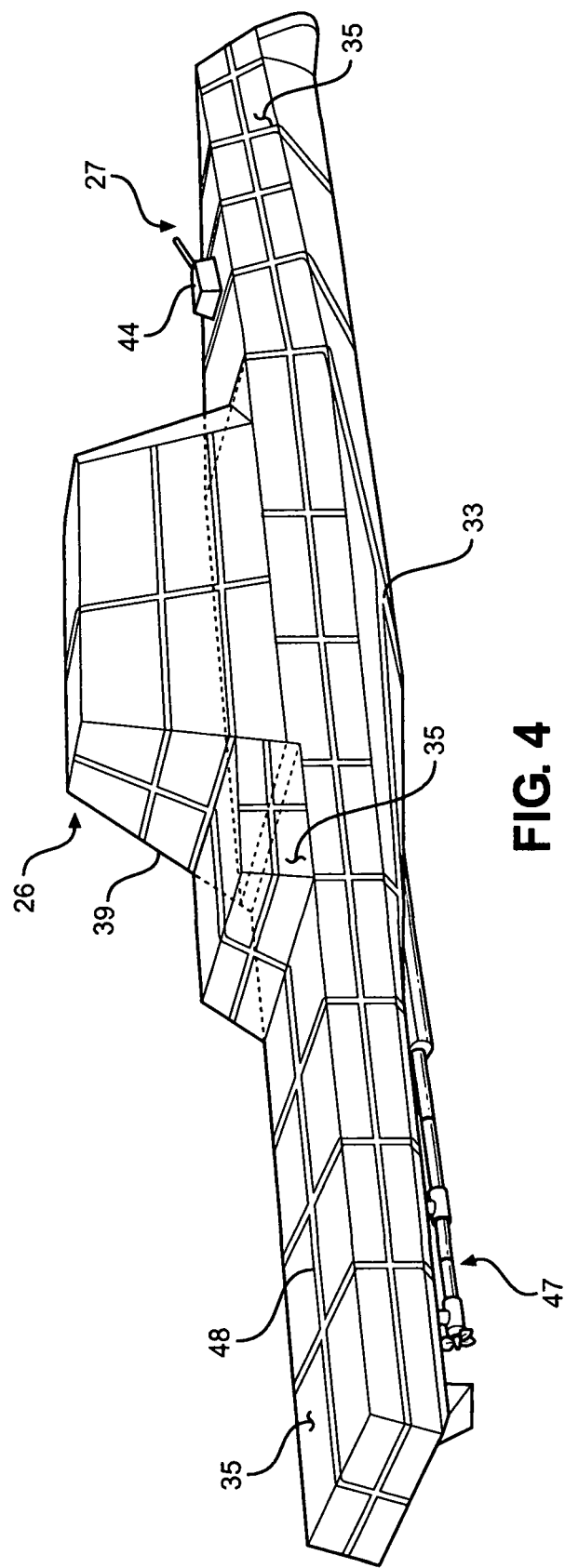
FIG. 4 is a schematic isometric illustration of an exemplary completed combatant marine vessel produced according to the invention with the interior metal truss structure visible for illustrative purposes only.

FIGS. 2-4 schematically illustrate the hull 25 (FIG. 2), the deckhouse 26 (FIG. 3), and a final combatant marine vessel 27 (FIG. 4), according to the invention, but with more substance than in FIG. 1.

The hull 25 (FIG. 2) is constructed of a metal truss structure illustrated by reference numerals 29-31. The elements 29-31 provide a high strength metal hull truss structure that is capable of carrying the major hull-girder-loads, giving the vessel its required stiffness, and supporting composite material panels (hereafter described) both above and below the marine vessel's proposed water line. The elements 29-31 may be standard structural steel sections (i. e. I-beams, taper flanges, equal and unequal angles, channels, fabricated sections, and truss sections) or welded box beams. As illustrated, preferably the truss structure elements 29-31 are primarily characterized by straight line contours. The metal used for constructing the hull elements is preferably selected from the group consisting essentially of HLSA-100 steel, AL-6XN stainless steel, and combinations thereof, and the truss elements are typically connected together including by welding, bolting, conventional marine adhesives, and/or riveting. For smaller combatant ships such as Littoral Combat Ships, 5000 series aluminum (including H116 and H321) may be used. However, due to the use of these particular truss elements 29-31 typically the amount of welding necessary to create the truss structure is less than in the production of conventional marine vessels, even as much as sixty-ninety percent less.

At the bottom portions of the hull 25. where necessary to handle slamming loads and to reduce water resistance and wake, curved and/or doubly curved composite panels 33 produced using VARTM are provided, attached to the truss elements 30 thereat primarily by bolts, conventional marine adhesives, and/or rivets. The panels 33 may comprise GRP panels wherein hundreds of glass strands (e. g. E glass and S-2 glass fibers, the latter typically only used for highly stressed critical panels) are combined with pigmented thermosetting UV resins, or vinyl ester for resin infusion, and the exterior surfaces are smooth. The panels 33 at the bottom and bow (46—see FIG. 5) of the hull 25 may include an outer polymer coating with high strain rate sensitivity to resist underwater blasts, and at the bow 46 to reduce slamming loads.

At other portions of the hull 25 wherein slamming loads are less likely to occur and reduced water-resistance and wake properties are not as critical, panels 35 are provided. The panels 35 are pultruded substantially flat composite panels and are attached to the truss elements 29, 31, etc. primarily by bolts, conventional marine adhesives, and/or rivets. All of the panels 33/35 where connected to each other are sealed and fastened along their edges to the truss by conventional techniques, and the connections will support acoustic damping as well as structural damping.

Conventional blast-resistant composite bulkheads (not shown) may also be installed within the open metal truss structure 29-31 and all equipment therein needing connection may be connected up before installation of the last of the panels 35.

Note that in FIG. 2 (and similarly in FIGS. 3 & 4) once the panels 33, 35 are installed the truss structure defined by elements 29-31 will not be visible (although the elements 29-31 are shown visible in the drawings simply for convenience and to enhance understanding). FIG. 2 also schematically illustrates necessary machinery/equipment 37 (which could include propulsion machinery, piping systems, electrical and electronic equipment, etc.) that is installed within the open truss structure volume before at least the above-water-line panels of the plurality of panels 35 are fully installed.

In some circumstances it may be desirable to manufacture the hull 25 by constructing fore-vessel, mid-vessel, and aft-vessel block zones (as illustrated schematically at 23 in FIG. 1), illustrated schematically at A, B, and C, respectively, in FIG. 2. Subsequently the three block zones A-C are assembled (including by welding) to produce the hull 25 prior to, or substantially contemporaneously with, connecting the hull 25 to the deckhouse 26.

FIG. 3 schematically illustrates a deckhouse (superstructure) 26 that is constructed using truss elements 39, 40 which are similar if not identical to the truss elements 29-31 in geometry, connection mechanisms, and materials (although high strength aluminum, which is less stiff than steel, may be more widely used than steel), to which composite panels 35 produced by pultrusion are attached and sealed together along their edges, just like for the hull 25. The composite panels 35 for the deckhouse 26 may have a thickness less than (e. g. about 10-60% less than) the majority of the composite panels for the hull 25, and conventional pultrusion practices allow for the ready production of substantially flat composite panels 35 of a wide variety of thicknesses (e. g. about one-four inches) depending upon the particular characteristics necessary for any particular part of the hull 25 or deckhouse 26.

In FIG. 3 portions of some of the panels 35 are cut away to schematically illustrate machinery/equipment (including radar, electronics, etc.) 42 that is installed within the deckhouse 26 before all of the panels 35 are fastened in place to the truss elements 39, 40, primarily by bolts, conventional marine adhesives, and/or rivets. An apertured floor (not shown) defined by metal plating or composite panels may also be provided.

Desirably at least the majority of, and preferably all of, the composite panels 33, 35 are spray coated on the inside with a fire retardant. One particular desirable material comprises a polysiloxane, that is the product of a two part resin system, such as is available from Nanosonic under the trade name HybridSil as discussed in U.S. Pat. No. 9,869,533, which spray coating also provides added protection against blasts, and assists in noise reduction.

FIG. 4 illustrates a marine vessel, in this case a combatant naval vessel 27 including weaponry 44, that is produced when the deckhouse 26 is attached to the hull 25, including by welding of truss elements of the deckhouse 26 and hull 25 together. The weaponry 44 is installed using conventional techniques and mechanisms.

Figure 5:
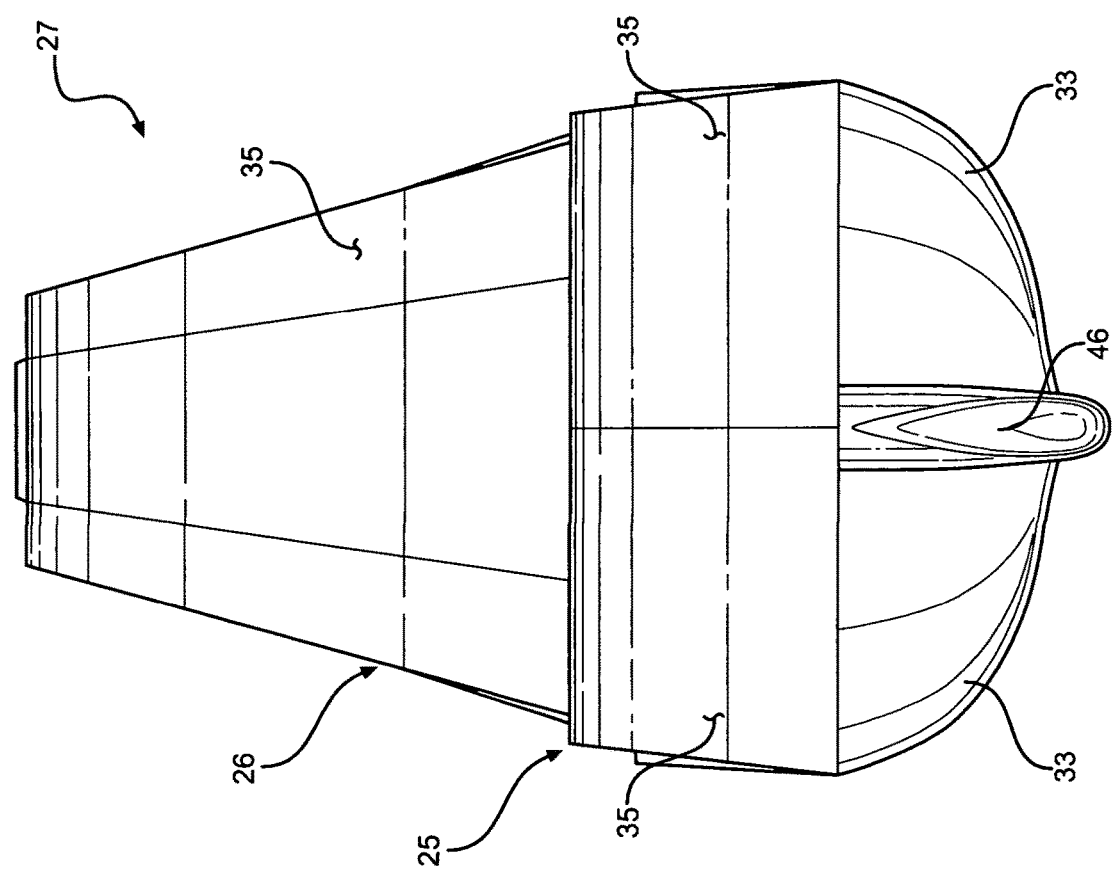
FIG. 5 is a front, bow, view of an exemplary completed combatant marine vessel produced according to the invention.

FIG. 5 is a front, bow, view of the naval vessel 27 produced according to the invention which shows more clearly the curved or doubly curved composite panels 33, and which does not show the truss structures for either the hull 25 or the deckhouse 26. The deckhouse 26 typically includes radar, electronics, etc., as discussed with respect to FIG. 3. The bulbous bow 46 seen in FIG. 5 is a completely integral panel (35) made by the VARTM process. The exterior propulsion system (e. g. propeller or screw) is not visible in FIG. 5 but is visible at 47 in FIG. 4.

Figure 6:
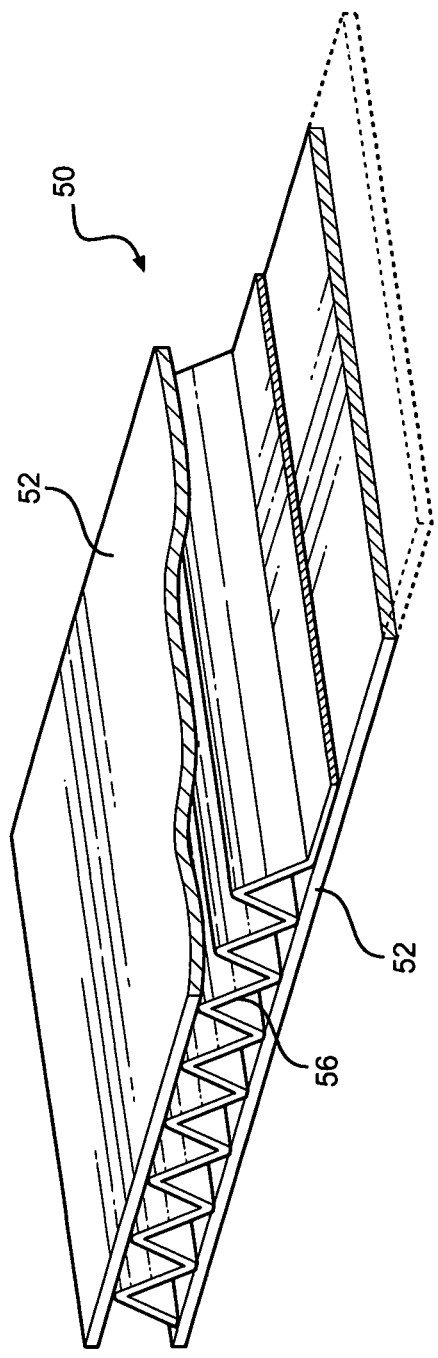
FIGS. 6 & 7 are schematic isometric and side views, respectively, of an exemplary helicopter landing pad produced according to the present invention.
Figure 7:
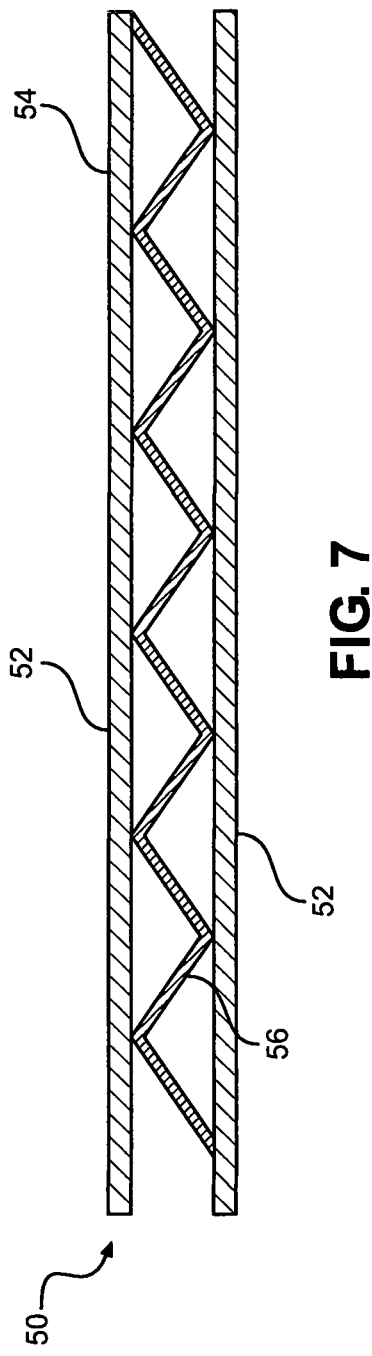

The vessel 27 may also include a helicopter landing deck, as at location 48 in FIG. 4, and shown by construction in FIGS. 6 & 7. The helicopter landing deck as seen generally at 50 in FIGS. 6 & 7 comprises one or more pultruded GRP composite panels 52 with an upper coating 54 containing a polymer with a high strain rate sensitivity to prevent impact damage. As illustrated the helicopter landing deck 50 is preferably defined by a pultruded GRP sandwich with conventional core elements 56 between upper and lower panels 52.

While the invention has been herein shown and described in what is presently conceived to be a preferred and practical form thereof, it is to be understood that the invention is to be interpreted broadly, and only limited by the prior art, so as to encompass all equivalent methods, processes, vessels, and structures, and specifically includes all narrower ranges within a recited broad range.

What is claimed is:

1. A method of producing a marine vessel, having a hull, and comprising:
    a) providing a high strength metal truss structure to carry the major hull-girder-loads, to provide the necessary stiffness to the hull, and to support composite material panels both above and below the marine vessel's proposed water line;
    b) producing at least one of curved and doubly curved composite panels for portions of the marine vessel below the proposed water line using vacuum assisted resin transfer molding;
    c) producing substantially flat composite panels for portions of the marine vessel both below and above the proposed water line using pultrusion;
    d) primarily by bolting, marine adhesives, and/or riveting fastening the curved and/or doubly curved composite panels from b) to the below water line portions of the marine vessel metal truss structure where necessary to handle slamming loads and to reduce water resistance and wake; and
    e) primarily by bolting, marine adhesives, and/or riveting fastening the substantially flat composite panels from c) to the marine vessel metal truss structure both above the water line, and below the water line where the resistance to slamming loads and reduction of water resistance and wake are not critical.

2. A method as recited in claim 1 wherein a) is practiced using standard structural steel sections or welded box beams.

3. A method as recited in claim 2 wherein a) is further practiced to provide truss structure elements primarily characterized by straight line contours.

4. A method as recited in claim 2 wherein the steel for practicing a) is selected from the group consisting essentially of HLSA-100 steel, AL-6XN stainless steel, and combinations thereof.

5. A method as recited in claim 1 wherein a) e) are practiced to produce a combatant naval vessel, including weaponry, as the marine vessel.

6. A method as recited in claim 1 wherein the hull includes a bottom and a bow, and wherein the method further comprises f) coating the panels from b) utilized at the bottom and bow with a polymer with high strain rate to resist underwater blasts and slamming loads; and further comprising g) providing the interior surfaces of at least the majority of the composite panels with a coating of a fire retardant which also provides added protection against blasts, and assists in noise reduction.

7. A method as recited in claim 1 wherein after the practice of a) for at least the above-water line portions of the vessel installing necessary equipment within the truss volume prior to completing e).

8. A method as recited in claim 1 wherein b) is practiced using molds produced by 3D printing.

9. A method as recited in claim 1 wherein the marine vessel above water line portion includes a helicopter landing deck; and further comprising f) constructing the helicopter landing deck using pultruded GRP composite panels in a sandwich with an upper coating containing a polymer with a high strain rate sensitivity to prevent impact damage.

10. A method as recited in claim 1 further comprising f) producing a deckhouse truss structure including by welding together metal structural elements and g) attaching the deckhouse truss structure to the hull truss structure including by welding; and wherein a) is practiced by constructing fore-vessel, mid-vessel, and aft-vessel block zones, and subsequently assembling the fore, mid, and aft block zones together prior to or substantially contemporaneously with g).

11. A method as recited in claim 1 wherein the hull includes a bottom and a bow, and wherein the method further comprises f) coating the panels from b) utilized at the bottom and bow with a polymer with high strain rate to resist underwater blasts and slamming loads.

12. A method as recited in claim 1 further comprising f) providing the interior surfaces of at least the majority of the composite panels with a coating of a polysiloxane fire retardant which also provides added protection against blasts, and assists in noise reduction.

13. A method as recited in claim 1 wherein b) is practiced to produce doubly curved composite panels for portions of the marine vessel hull below the proposed water line using vacuum assisted resin transfer molding; and wherein the method further comprises f) coating the doubly curved panels from ii) utilized at the bottom and bow of the hull with a polymer with high strain rate to resist underwater blasts and slamming loads.

14. A method of constructing a marine vessel comprising:
i) producing a high strength hull truss structure including by welding together metal structural elements;
ii) producing curved and/or doubly curved composite panels for portions of the marine vessel hull below the proposed water line using vacuum assisted resin transfer molding;
iii) producing substantially flat composite panels for portions of the marine vessel hull both below and above the proposed water line using pultrusion;
iv) installing propulsion and heavy machinery within the open metal truss structure;
v) installing blast-resistant composite bulkheads within the hull open metal truss structure and connecting up all equipment needing connection;
vi) primarily by bolting, marine adhesives, and/or riveting fastening the curved and/or doubly curved composite panels from ii) to the below water line portions of the hull metal truss structure where necessary to handle slamming loads and to reduce water resistance and wake;
vii) primarily by bolting, marine adhesives, and/or riveting fastening the substantially flat composite panels from iii) to the hull metal truss structure both above the water line, and below the water line where the resistance to slamming loads and reduction of water resistance and wake are not critical;
viii) producing a deckhouse truss structure including by welding together metal structural elements;
ix) installing radar and other necessary equipment within the deck open metal truss structure;
x) attaching the deckhouse truss structure to the hull truss structure including by welding; and
xi) either before or after x) primarily by bolting, marine adhesives, and/or riveting fastening the substantially flat composite panels from iii) to the deckhouse metal truss structure.

15. A method as recited in claim 14 wherein i) is further practiced using standard structural steel sections or welded box beams and to provide truss structure elements primarily characterized by straight line contours.

16. A method as recited in claim 14 wherein i) is practiced by constructing fore-vessel, mid-vessel, and aft-vessel block zones, and subsequently assembling the three block zones together prior to or substantially contemporaneously with x).

17. A method as recited in claim 14 wherein the hull includes a bottom and a bow, and wherein the method further comprises xii) coating the panels from ii) utilized at the bottom and bow with a polymer with high strain rate to resist underwater blasts and slamming loads.

18. A method as recited in claim 14 further comprising xii) providing the interior surfaces of at least the majority of the composite panels with a coating of a polysiloxane fire retardant which also provides added protection against blasts, and assists in noise reduction.

19. A method as recited in claim 14 wherein the marine vessel above water line portion includes a helicopter landing deck; and further comprising xii) constructing the helicopter landing deck using pultruded GRP composite panels in a sandwich with an upper coating containing a polymer with a high strain rate sensitivity to prevent impact damage.

20. A method as recited in claim 14 wherein ii) is practiced to produce doubly curved composite panels for portions of the marine vessel hull below the proposed water line using vacuum assisted resin transfer molding; and wherein the method further comprises xii) coating the doubly curved panels from ii) utilized at the bottom and bow of the hull with a polymer with high strain rate to resist underwater blasts and slamming loads.

* * * * *